UNITED STATES PATENT OFFICE.

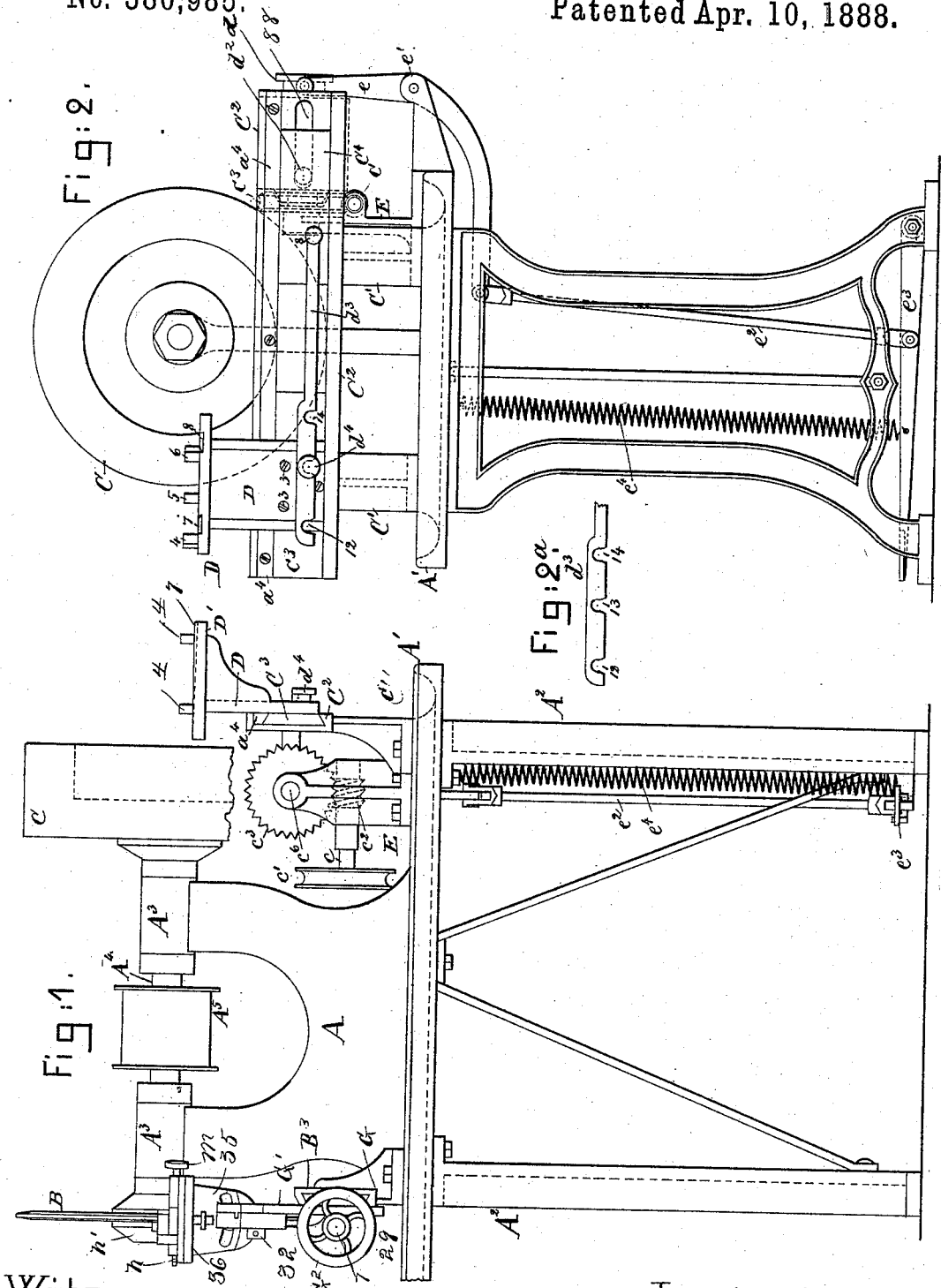

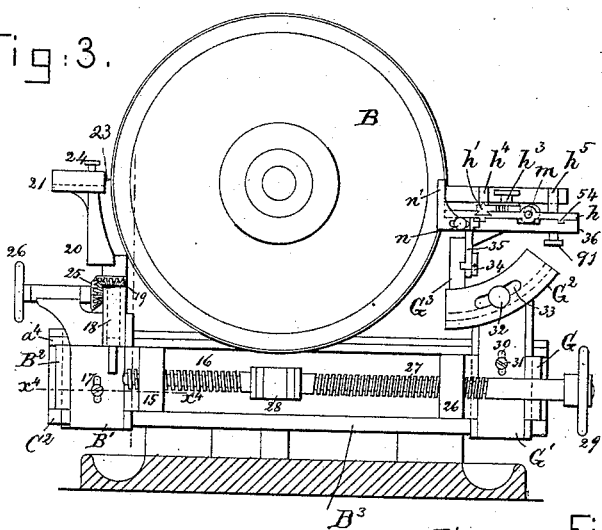

MATTHIAS BROCK, OF BOSTON, MASSACHUSETTS.

MECHANISM FOR GRINDING DIES.

SPECIFICATION forming part of Letters Patent No. 380,985, dated April 10, 1888.

Application filed June 11, 1886. Serial No. 204,852. (No model.)

*To all whom it may concern:*

Be it known that I, MATTHIAS BROCK, of Boston, county of Suffolk, and State of Massachusetts, have invented an Improvement in Mechanism for Grinding Dies for Nail-Cutting Machines, of which the following description, in connection with the accompanying drawings, is a specification, like letters on the drawings representing like parts.

This invention has for its object the construction of a machine by which to automatically hold and grind the beveled faces of the dies of machines employed in the manufacture of cut tacks and nails, and also groove or score the same.

The machine herein shown as embodying my invention contains, preferably, a grinding-wheel and a scoring-wheel, composed, preferably, of emery, the said wheels being attached, preferably, to one and the same rotating spindle or shaft. One of these wheels, called a "cup-wheel," is made effective in grinding the beveled ends of the dies while they are held in a suitable carriage, and preferably while held in a groove in the said carriage, the bottom of the said groove, or the part of the carriage supporting the die, being ground being properly inclined with relation to the acting face of the cup-wheel to give to the end of the die the desired bevel, the said carriage during the operation of grinding or beveling the end of the die being reciprocated automatically by mechanism which will be described. The scoring-wheeel at the opposite end of the shaft is more or less rounded at its periphery or acting edge, according to the shape of the score or groove to be made in the face of the die, the shape of the said score or groove depending upon the shape desired for the body or shank of the cut tack or nail to be made. To keep the acting edge of the scoring-wheel to its established curve or shape, I have provided the machine with a wheel-shaping tool composed, preferably, of a diamond confined in a suitable holder mounted upon a pivoted carriage, made vertically adjustable with relation to the frame-work, the holder for the diamond being adjustable longitudinally in the said carriage.

Near the periphery of the scoring or grooving wheel opposite the diamond I have placed a rest for the die to be scored or grooved, the said rest being made adjustable vertically; and, as herein shown, the said rest has also a rocking motion and a motion in the arc of a vertical circle, as will be described, the arc of the vertical circle in which the rest is made adjustable having as its center the point of contact of the scoring or grooving wheel with the uppermost side of the die being acted upon.

Figure 1 in side elevation represents a machine embodying my invention; Fig. 2, a right-hand end view of Fig. 1; Fig. $2^a$, a detail to be referred to. Fig. 3 is a left-hand elevation of Fig. 1, the supporting-stand being omitted. Fig. $3^a$ is a partial section of Fig. 3 in the dotted line $x^4$ $x^4$; Fig. 4, a top or plan view of Fig. 1; Fig. 5, a detail showing the relative positions of the bed-die and movable die when in a tack cutting and heading machine; Fig. 6, a top view of Fig. 5; Fig. 7, a side elevation and top view of a tack such as will be produced by dies of the shape shown. Fig. 8 is an elevation of the carriage for holding the diamond, the way in which the carriage slides being in section. Fig. 9 is a top and end view of the heading-tool, and Fig. 10 is a section of the upper part of the carriage used next the cup-wheel. Fig. 11 is a section of Fig. 4, taken through the hub $d$ in the line $x^6$. Fig. 12 is an under side view of the rest-plate $h$, and Fig. 13 a top view and side elevation of the bed 36.

The frame-work A, of suitable shape to support the working parts, has a foot, A', which, as shown in Figs. 1 and 2, is supported upon a stand, $A^2$, the said frame-work having, as herein shown, two bearings, $A^3$, which support the main rotating shaft $A^4$, having secured to it a suitable belt-pulley, $A^5$, driven from any usual source. The shaft $A^4$ has secured to it at one end a grinding-wheel, C, herein denominated a "cup-wheel," it having its face recessed or cut away, as in dotted lines, Fig. 1, leaving only a portion of the side of the wheel as an acting surface. The opposite end of the shaft has secured to it, in manner customarily practiced for holding saws and other disks on arbors, a scoring or grooving wheel, B, the periphery of which is more or less curved or rounded, according to the shape of the score or groove (see Figs. 5 and 6) to be made in the face of the die $a$ or $b$, the die $a$ being denominated the "bed-die," while the die $b$ is usually called the "movable die."

Referring to Figs. 5 and 6, it will be noticed that the faces of these dies are beveled, not only in the direction of their width, but also in the direction of their depth, each of the said dies being provided with a score or groove, 37.

In practice the score or groove in each die must be of just the same size, and the faces of the dies at each side of the score or groove must contact perfectly in order to insure the proper shape for the shank of the tack or nail $a'$, (see Fig. 7,) and preserve uniformity in all the tacks or nails produced. In practice the two dies hold the shanks of the tacks or nails, while a suitable header, $p$, (see Fig. 9,) forms the head $a^2$ for the back.

The foot $A'$ has secured to it by suitable bolts the feet $C'$ (see Fig. 2) of a stationry guideway, $C^2$, in which is fitted to slide not only a slide, $C^3$, but also a like slide, $C^4$, each of the said slides being dovetailed in cross-section, as shown by the slide $C^3$, Fig. 1, and being held in position in the guideway by a gib, $a^4$. (See Figs. 1 and 2.)

The slide $C^3$ has secured to it by suitable screws, 3, a carriage, D, (shown separately in Fig. 10,) it having at its top a rest, $D'$, provided, as herein shown, with stops 4, 5, and 6, and also with two diagonal grooves, 7 and 8. The pins 4 and 6 referred to are used in pairs, and are so set that the pins of each pair do not occupy a position at the same distance from the end of the carriage. The grooves 7 8 (see Fig. 10) are deeper at the outer sides of the carriage than at the sides of the carriage next the cup-wheel. The difference in depth of each groove enables the tool to be so held and presented to the cup-wheel that the bevel of the tool from its upper to its lower side may be correctly obtained.

The pins 4 4 and the groove 7 co operate in holding the die $a$ when its face is to be ground, the pins 4 4 being so located as to insure the proper bevel of the die from side to side. The pins 6 6 and the groove 8 co-operate to hold the die $b$ when its face is to be beveled to co-act with the beveled face of the die $a$. The pins 5 5 are made available to hold the heading-tool $p$ when it is to be ground, its end being square.

The foot $A'$ has also erected upon it a stand, E, which has suitable bearings to support a shaft, $c$, having a pulley, $c'$, which may be driven by a belt or otherwise from any suitable source, the shaft $c$ having a worm, $c^2$, (see Fig. 1,) which engages with and rotates a worm-gear, $c^3$, mounted loosely upon a suitable stud, $c^6$, held in the said stand. The face of this worm-toothed gear $c^3$ is concaved, (see dotted lines, Fig. 2, and sectional, Fig. 11,) to form part of a clutch, the other part being the beveled end of a hub, $d$, supported loosely upon the said stud $c^6$. This hub $d$ has a cam-groove, $d'$, in which enters a roller-stud, $d^2$, (see Fig. 4,) attached to the slide $C^4$, and extended through a slot, 88, therein, (see Fig. 2,) the rotation of the hub $d$ causing the reciprocation of the said slide. The slide $C^4$ has pivoted upon it at 8 (see Fig. 2) a latch, $d^3$, provided, as herein shown, with three notches, 12 13 14, (see Fig. 2ª,) located at different distances from its end, either one of which may be made to engage a headed stud or pin, $d^4$, attached to the carriage D.

In Fig. 2 the latch is shown as having its notch 13 engaged with the pin or stud $d^4$, the carriage at such time being reciprocated far enough to grind the heading-tool $p$; but if the notch 12 were in engagement with the stud $d^4$ then the reciprocations of the carriage D would be so changed as to enable the die $b$, resting against pins 6, to be ground by the wheel C, and if the notch 14, especially made to engage the stud $d^4$, then the die $a$ in the groove 7 and against the pins 4 might be ground.

The hub $d$ (see Figs. 2 and 4) at its rear end is reduced in diameter and provided with an annular groove, which is entered by pins or projections (see Fig. 4) $p'$ of a forked arm, $e$, forming part of a lever pivoted at $e'$, the opposite end of the said lever having jointed to it a rod, $e^2$, attached to a suitable treadle, $e^3$, which is normally kept elevated by a spring, $e^4$, the lever $e$ at such times acting upon and drawing the hub $d$ away from the gear $c^3$, thus keeping the two parts of the clutch referred to separate, so that the gear $c^3$ runs loose and does not actuate the cam $d$; but as soon as the operator depresses the lever or treadle $e^3$ the cam $d$ is made to move laterally, closing the clutch and effecting the rotation of the cam $d$.

The periphery or acting edge of the scoring or grooving wheel B must be kept uniform, in order to accurately grind the groove at the ends of the dies, and to insure this uniformity in the acting periphery of the said wheel I have provided at one side of the machine a carriage, $B'$, (see Fig. 3ª,) of dovetailed shape, it being fitted in a dovetailed groove in the slide $B^2$, also made dovetailed in cross-section, and fitted into a guideway, $B^3$, mounted upon the frame-work. The slide $B^2$ has a threaded ear, 15, (see Fig. 3,) which receives a screw, 16.

The carriage $B'$ is slotted (see Fig. 3) to receive a screw, 17, (see Figs. 3 and 3ª,) by which to adjust the carriage vertically in the slide $B^2$.

The carriage $B'$ has a socket which receives a pin, 18, (see dotted lines, Fig. 3,) provided at its upper end with a toothed segment, 19, which is also attached to the arm 20, which at at its upper end has a guide, 21, in which is placed the holder 22, which holds the diamond 23, the said holder being confined in position by a suitable pin or screw, 24. The carriage $B'$ has a suitable bracket, to receive a short shaft, (see Fig. 3,) provided at one end with a beveled gear, 25, and at its other end with a hand-wheel, 26, the beveled gear 25 engaging the segment 19, and turning the arm 20 about its vertical pivot 18, so that the diamond 23 may travel around the periphery of the scoring-wheel to give to it its proper curvature, the said diamond acting to keep the periphery of the wheel in proper shape. The guideway $B^3$ has in it a slide, G, (see Figs. 1 and 3,) provided with a lug, 26, which is entered by the screw 27.

The screws 16 and 27 are practically one screw, one having a right-hand and the other a left-hand thread, the screw being held against longitudinal movement by means of a loop-like bearing, 28, attached to a stationary part of the frame, so that the rotation of the said screws by the hand-wheel 29 causes the slides $B^2$ and G to be moved toward or from each other at the same rate of speed. The slide G contains in it the foot G' of a carriage, (see Figs. 1 and 3,) which is made vertically adjustable by means of the slot 30 and screw 31. The upper end of this foot G' has attached to it by a screw, 32, in a slot, 33, the segmental foot $G^2$, provided with a standard, $G^3$, and this standard has connected to it by a screw, 34, the foot 35 of a bed, 36. The bed 36 has mounted upon it a segmentally-shaped rest-plate, $h$, provided at its under side with a segmental projection, 54, (see Fig. 3,) entering a segmental groove in the bed 36.

The rest-plate $h$ is provided at its upper side with a dovetailed groove (see Fig. 3) to receive a dovetailed rest, $h'$, which at one edge is provided with rack-teeth, (shown best in Fig. 4,) which teeth are engaged by the teeth of a pinion, $h^2$, on a short shaft, $h^3$, provided at its upper end with a head or thumb-wheel, as shown in Fig. 3, the thumb-wheel being omitted in Fig. 4, so as not to conceal the pinion $h^2$.

The rest $h'$ is provided with a pin, $h^4$, against which is placed one side of the die $b$, the face of which is to be provided with a groove, as at 37, the rotation of the shaft $h^3$ altering the position of the guide-pin $h^4$, in order that the die may be located properly with relation to the acting edge of the grooving or scoring wheel. The rest-plate $h$ has erected upon it a pin, $h^5$, which also serves as a guide for the rear end of the die $b$ being ground. The rest-plate $h$ has at its under side a second segmental projection, 89, (see Fig. 12,) which enters a correspondingly-shaped groove in or co-operates with a correspondingly-shaped shoulder, 90, (see Fig. 13,) in the bed 36, thus leaving the plate $h$ free to be adjusted upon the bed 36 about a vertical center coincident with the center of the curve of the periphery of the wheel; and this rest-plate also has two lugs or ears which receive in them a shaft, $m$, (see Fig. 3,) provided with an eccentric, $m'$, (see Fig. 4,) upon which rests the under side of the tool or die $b$ being scored or grooved, the partial rotation of the said shaft causing the eccentric to raise or lower the outer end of the die in order to insure the proper amount of difference of depth in the groove from the upper to the lower side of the die.

The bed 36, near its front end, has adjustably attached to it by a screw, $n$, (see Fig. 3,) a finger, $n'$, which nearly touches the scoring-wheel B, the said finger being shaped to form a stop for the end of the die $b$ at one side of the groove being made therein, the said stop serving to determine the depth of the groove or score in the said die.

By connecting the two slides $B^2$ and G, the former carrying the carriage which supports the diamond and the latter the rest-plate $h$ and its adjusting devices, it is possible to insure the uniform movement of the diamond and of the stop $n'$ with relation to the acting periphery of the scoring-wheel and insure for the periphery of the wheel a shape suitable to make the groove in the end of the die of the shape required for the body of the tack or nail, the depth of the groove being determined by the position of the finger $n'$ and the inclination of the groove by the bed 36 and its parts.

The grooves 7 and 8 in the top plate, D', of the carriage D may be made of greater depth than shown, so that the sides thereof may serve the purpose of the pins 4 and 6, and instead of providing the carriage with grooves varying in depth to insure the bevel of the end of the die from top to bottom I may mount the top plate, D', upon the upright D by a segmental foot, as $G^2$, Fig. 3, employed to adjust the standard $G^3$.

The rest-plate $h$ and bed 36 are connected together in adjusted position by a thumb-screw 91. (See Fig. 3.)

I claim—

1. The grinding-wheel C and the reciprocating carriage D, having a top or rest, D', provided with two or more sets of pins or projections arranged in pairs, the centers of the pins or projections of each pair being in a line at an angle to the face of the grinding-wheel according to the bevel to be given to the ends of the cutters, the said top or rest being also provided with two grooves of varying depth from end to end, substantially as described.

2. The guideway, the slide $C^4$, and its attached latch having separate notches, combined with the slide $C^3$, its attached carriage having a top plate, D', and a pin or stud, $d^4$, and the wheel C, whereby the stroke of the carriage D may be changed to enable two or more different dies to be held upon it to be ground.

3. The guideway, the slide $C^4$, having the pin or stud $d^2$, the slide $C^3$ and its attached carriage, and latch to connect them, combined with the cam-hub $d$, and with a clutch to operate it at the proper times, substantially as described.

4. The carriage having the adjustable arm 20, provided with a gear, combined with a pinion to partially rotate the said arm, the axis of the said pinion being tangential to the periphery of the scoring-wheel, and with a diamond-holder to hold a diamond to shape the edge of the said wheel, and with the adjusting devices to adjust the said diamond-holder toward and from the periphery of the wheel, substantially as described.

5. The guideway $B^3$, the slide $B^2$, the carriage B', made adjustable vertically in the said slide and provided with the arm 20, pivoted with relation to the said carriage, combined with means, substantially as described, to turn the said arm 20 in the arc of a circle about the periphery of the said grooving-wheel, substantially as described.

6. The bed 36 and the rest-plate $h$, having a pin or projection, $h^5$, combined with the rest $h'$, having a pin or projection, $h^4$, and with means to adjust the plate $h$, substantially as described.

7. The wheel B, the bed 36, the rest-plate $h$ thereon, having a pin or projection, $h^5$, and the adjustable rest $h'$, having a pin or projection, $h^4$, combined with the standard $G^3$, made adjustable in the arc of a vertical circle struck from the periphery of the said wheel, and with means, substantially as described, to tip the said bed 36 about a center at right angles to the axis of rotation of the said wheel, as set forth.

8. The bed 36, the rest-plate $h$ thereon, and the rest-plate $h'$, having a pin or projection, combined with an eccentric to support the die to be grooved or scored.

9. The wheel B, the rest-plate $h'$, the standard $G^3$, and the bed 36, made adjustable on the said standard, combined with the foot $G'$, upon which the said standard is made adjustable in the arc of a circle at right angles to the axis of rotation of the shaft carrying the said scoring-wheel, substantially as described.

10. The rest-plate $h$ and bed 36, and the standard $G^3$, having a segmental foot, combined with the vertically-adjustable carriage $G'$, slide to hold the same, and guideway for the slide to operate in, substantially as described.

11. The bed 36 and the rest-plate thereon, combined with the finger $n'$, to serve as a stop for the end of the die being grooved, substantially as described.

12. The combination, in a machine for grinding tack-making dies at a bevel, and also grooving the same, of a rotating shaft, $A^4$, its attached cup-shaped grinding-wheel C, the grooving or scoring wheel B, the reciprocating carriage D, having a top or rest, D', provided with pins or projections 4 and 6, arranged in pairs to hold the tools while their faces are being ground to the proper bevel, the rest-plate $h$, having a pin or projection, $h^5$, the plate $h'$, having a pin or projection, $h^4$, the bed 36, to support the plate $h$, and means to adjust the said bed, whereby the beveled face-dies may be scored or grooved to the angle desired, substantially as described.

13. The combination, in a machine for scoring or grooving dies, of the following instrumentalities, viz: a scoring or grooving wheel, a guideway, a slide, $B^2$, a carriage, B', adjustable therein and having an arm provided with a holder containing a diamond by which to shape the periphery of the said wheel, a slide, G', a carriage therein, a bed connected to the said carriage, a rest-plate, $h$, mounted in the said bed, a connected finger, $n'$, to form a stop, as described, and a right and left hand threaded screw to connect the two slides $B^2$ and G, whereby when the slide $B^2$ is adjusted to cause the diamond to reduce the diameter of the said wheel, and the bed 36 and rest-plate with its attached finger will be correspondingly advanced toward the center of rotation of the said wheel B, to insure uniformity in depth of groove to be made in the dies, notwithstanding variations in the diameter of the said wheel, substantially as described.

14. In a machine for grinding scores in dies used in tack-making, the scoring-wheel B, the rest $h$, to support the tool to be scored, pivoted, being parallel to the axis of the said wheel, a bed, 36, upon which the said rest is pivoted, means to adjust the said bed radially toward and from the center of rotation of the said wheel, the standard $G^3$, having a foot, $G^2$, and the vertically-adjustable post G', upon which the foot $G^2$ is made adjustable, substantially as described.

15. The scoring-wheel B, the standard $G^3$, provided with the segmental foot, the foot G', upon which the foot $G^2$ is adjustable in the arc of a circle, and the bed 36, its attached foot 35, made adjustable in the arc of a circle on the standard $G^3$, combined with the adjustable rest-plate $h$, made adjustable on the bed 36 in the arc of a circle, the combination being and operating substantially as described, whereby the tool may be adjustable, substantially universally, for the purpose set forth.

In testimony whereof I have signed my name to this specification in the presence of two subscribing witnesses.

MATTHIAS BROCK.

Witnesses:
G. W. GREGORY,
C. M. CONE.